Figure 9:
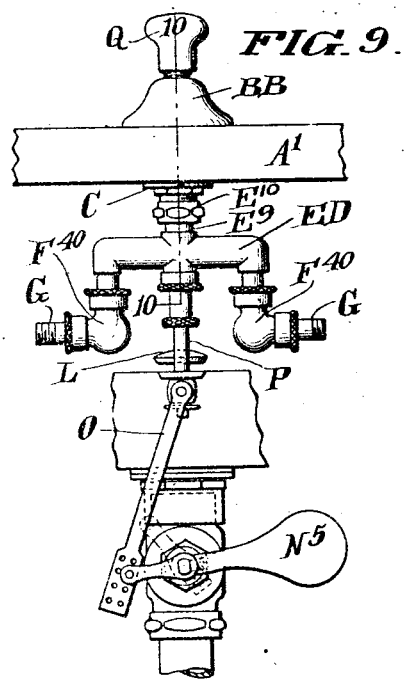

W. A. SPEAKMAN.
LAVATORY FIXTURE.
APPLICATION FILED DEC. 1, 1911.
1,036,022.
Patented Aug. 20, 1912.
5 SHEETS—SHEET 1.
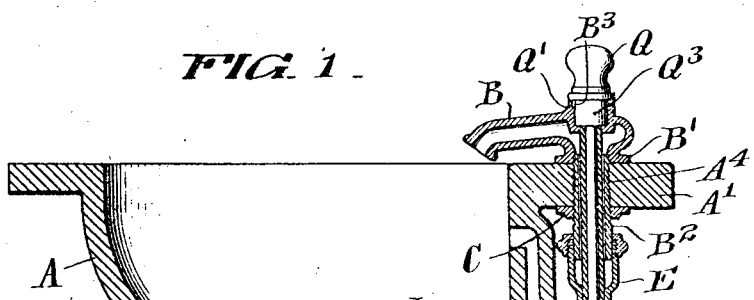
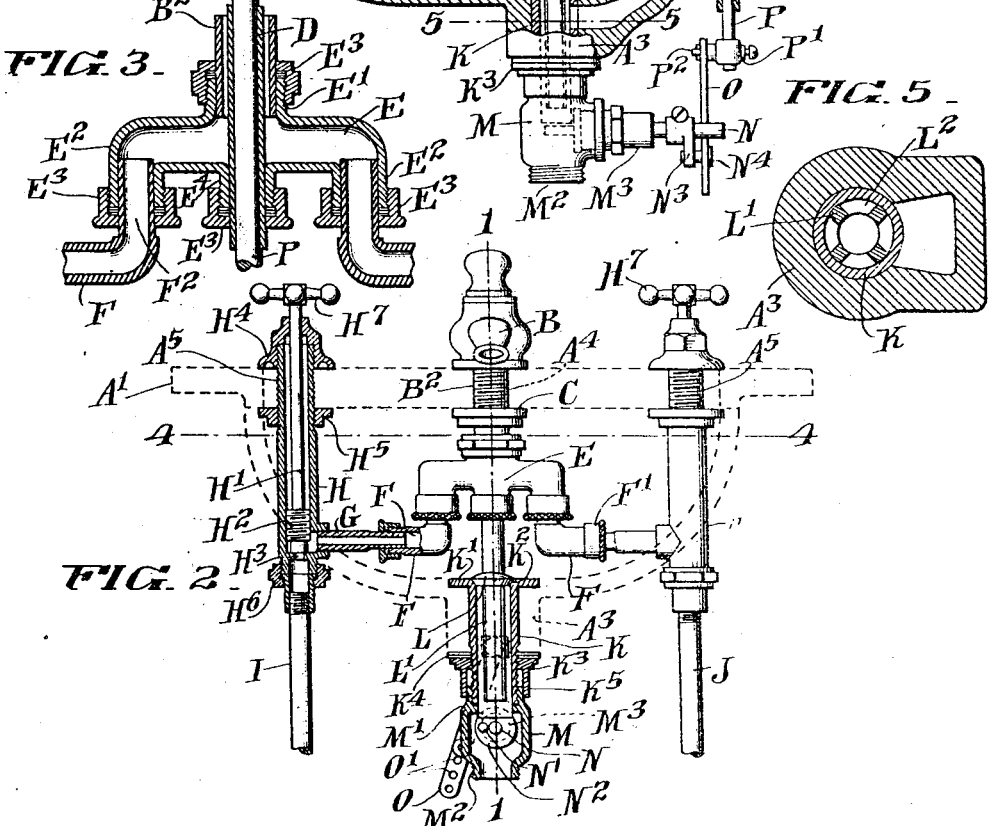

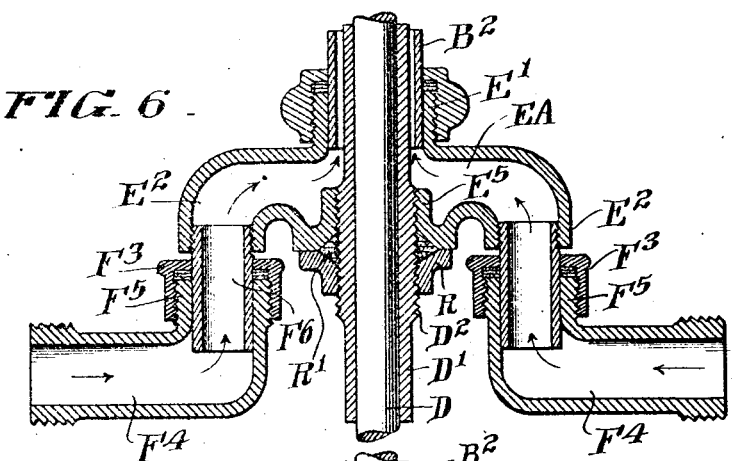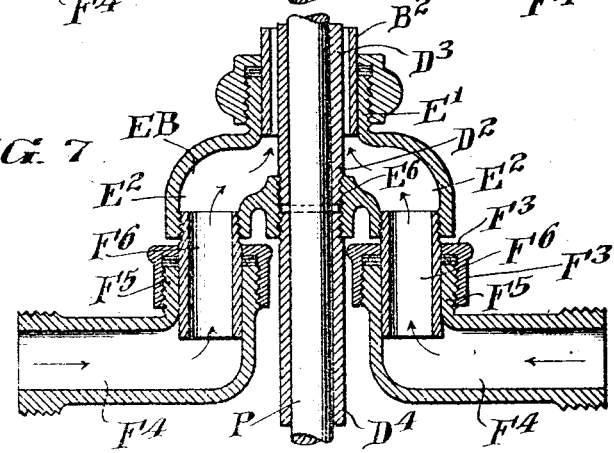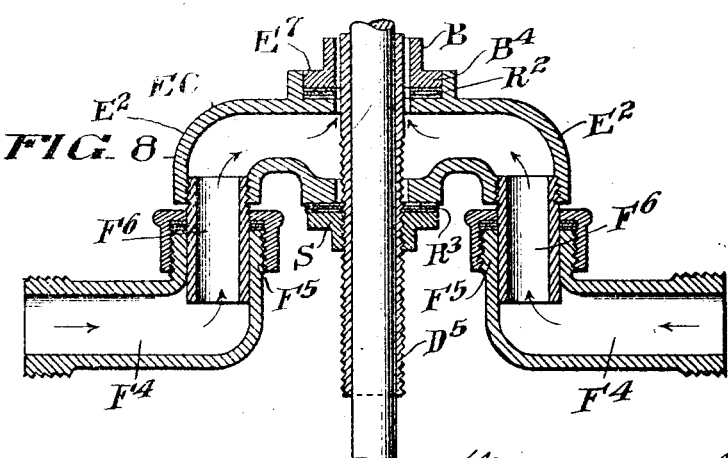

W. A. SPEAKMAN.
LAVATORY FIXTURE.
APPLICATION FILED DEC. 1, 1911.

1,036,022.

Patented Aug. 20, 1912.
5 SHEETS—SHEET 3.

WITNESSES

INVENTOR
Willard A. Speakman
BY
ATTORNEY

W. A. SPEAKMAN.
LAVATORY FIXTURE.
APPLICATION FILED DEC. 1, 1911.
1,036,022.
Patented Aug. 20, 1912.
5 SHEETS—SHEET 4.
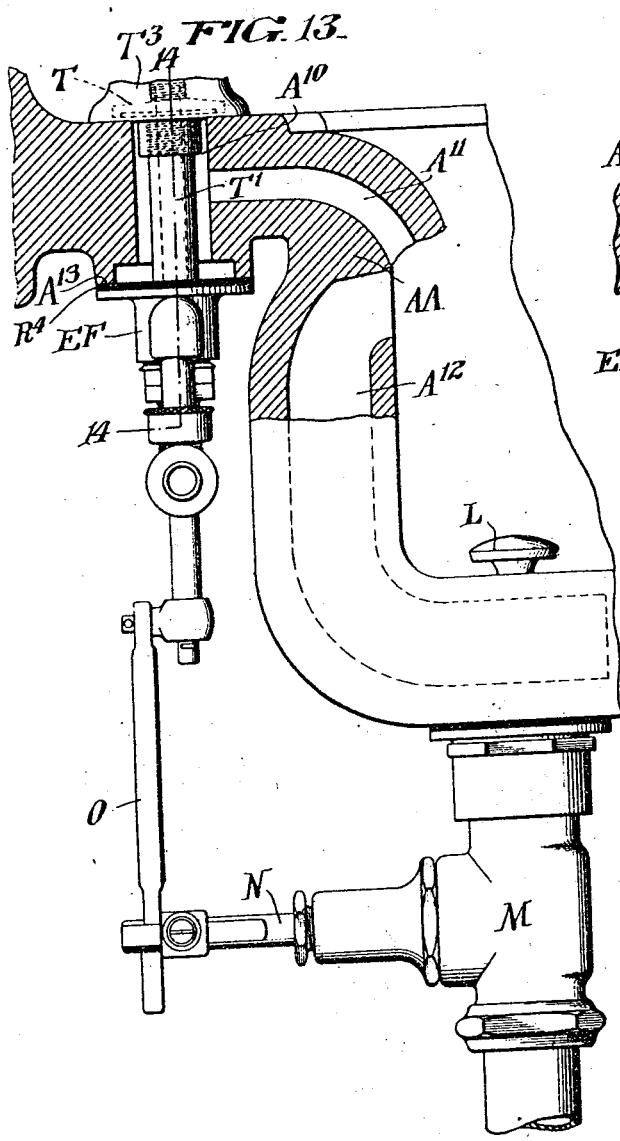
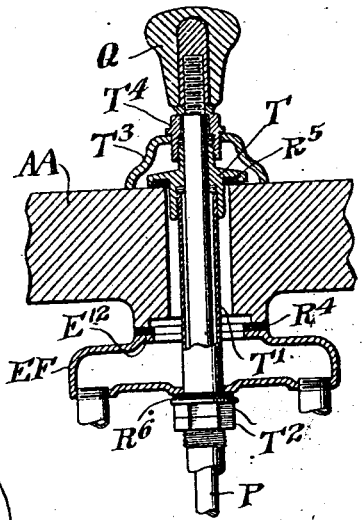
WITNESSES
INVENTOR
BY
ATTORNEY W. A. SPEAKMAN.
LAVATORY FIXTURE.
APPLICATION FILED DEC. 1, 1911.
1,036,022.
Patented Aug. 20, 1912.
5 SHEETS—SHEET 5.
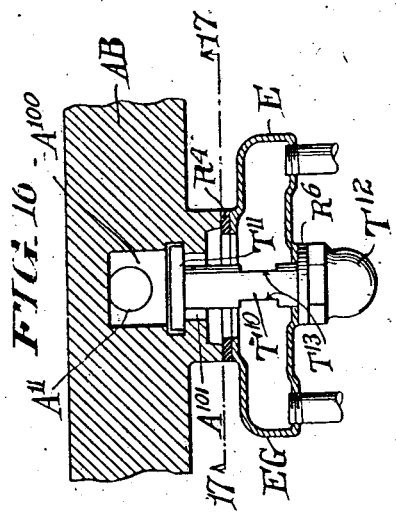
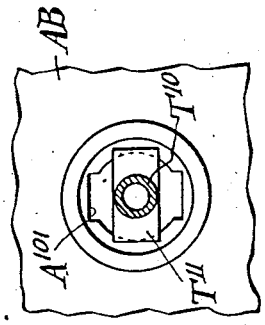
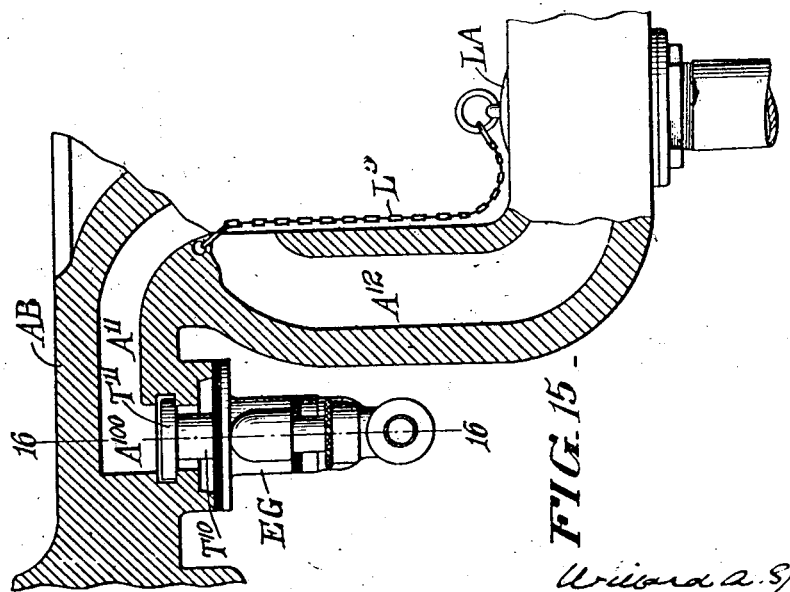

UNITED STATES PATENT OFFICE.

WILLARD A. SPEAKMAN, OF WILMINGTON, DELAWARE.

LAVATORY-FIXTURE.

1,036,022.  Specification of Letters Patent.  Patented Aug. 20, 1912.

Application filed December 1, 1911. Serial No. 663,367.

*To all whom it may concern:*

Be it known that I, WILLARD A. SPEAKMAN, a citizen of the United States of America, residing in the city of Wilmington, in the county of Newcastle and State of Delaware, have invented a certain new and useful Improvement in Lavatory-Fixtures, of which the following is a true and exact description, reference being had to the accompanying drawings, which form a part thereof.

My present invention relates to combination fixtures such as are employed for supplying hot and cold water to the wash basins of lavatories.

One object of the invention is to provide an effective fixture of the kind in which hot, cold, or tempered water is discharged into the basin through a single discharge nozzle, which fixture, in addition to being simple in construction and relatively inexpensive to manufacture, has a capacity for adjustment permitting the fixture to be readily assembled on basins varying somewhat in style without any permanent alteration of parts, and without any fitting operation requiring the labor of a skilled plumber.

More particularly, I aim to provide a fitting of the character described which can be readily affixed and without pipe cutting, threading, or like operations involving a permanent alteration of parts to any one of a variety of fixture supporting basin slabs now in general use and on the market and alike in that each slab has three fixture receiving orifices, but with the distance between, and relative levels of the orifices in any one slab not necessarily the same as the corresponding distances and relative levels of others of said slabs.

My invention is useful alike in fixtures of the kind comprising a metallic discharge nozzle located above the lavatory and through which hot, cold, or tempered water is discharged into the lavatory basin; and in fixtures adapted to be fitted to lavatory basins in which the discharge into the lavatory basin is through a channel formed in the basin structure proper.

My improved fitting preferably includes, in some cases, a waste valve and operating mechanism therefor, which passes through the hot and cold water mixing portion proper of the fixture, and one object of the invention is to provide a waste valve and operating mechanism therefor which can be readily assembled with assurance of proper operation.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described forms in which the invention may be embodied.

Figure 11:
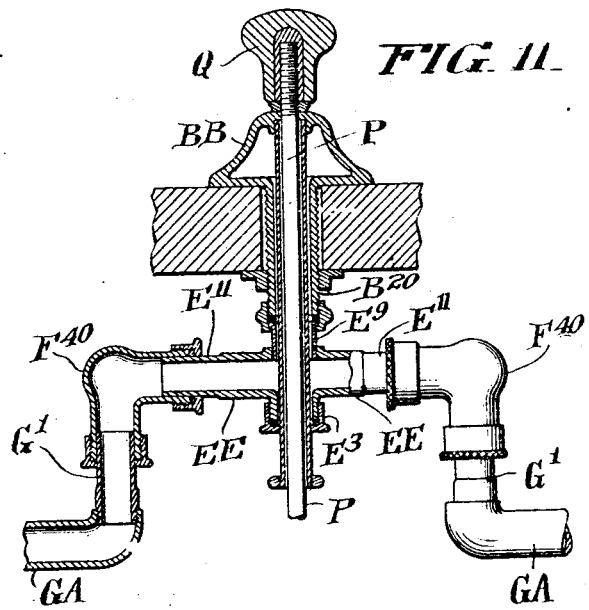
Figure 10:
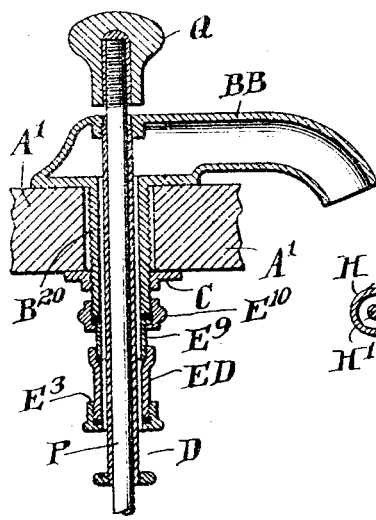
Figure 12:
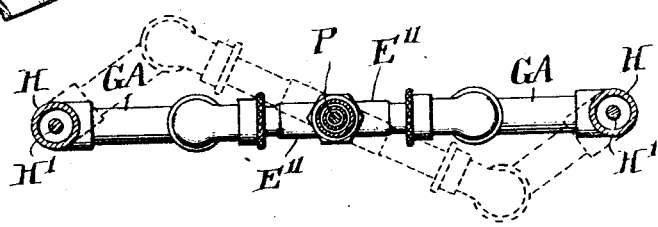

Of the drawings, Figure 1 is a sectional elevation of a basin equipped with one form of my improved fixture, in which the fixture comprises a discharge nozzle located above the basin slab, the section being taken on the line 1—1 of Fig. 2. Fig. 2 is an elevation of the assembled fitting with the basin shown in dotted lines and parts of the fitting broken away and in section. Fig. 3 is a sectional elevation of a portion of the apparatus of Figs. 1 and 2 taken at right angles to Fig. 1. Fig. 4 is a section through the fitting, taken on the line 4—4 of Fig. 2. Fig. 5 is a section on the line 5—5 of Fig. 1. Figs. 6, 7 and 8 are views taken similarly to Fig. 3, and each showing a construction differing in some respects from that shown by the others of these views. Fig. 9 is a view taken similarly to Fig. 2 showing a portion of another modification. Fig. 10 is a partial sectional elevation on the line 10—10 of Fig. 9. Fig. 11 is an elevation partly in section of another modification. Fig. 12 is a sectional plan taken similarly to Fig. 4, of apparatus embodying the modification of Fig. 11. Fig. 13 is a partial sectional elevation of a portion of a lavatory having the discharge nozzle formed in the lavatory proper and one form of my improved fixture affixed thereto. Fig. 14 is a partial sectional elevation on the line 14—14 of Fig. 13. Fig. 15 is a partial sectional elevation of another form of lavatory having the discharge nozzle formed in it and equipped with another form of my fixture. Fig. 16 is a partial section taken on the line 16—16 of Fig. 15, and Fig. 17 is an inverted sectional plan taken on the line 17—17 of Fig. 16.

In the apparatus shown in Figs. 1 to 5 of the drawings, A represents the body or bowl of the wash basin, and A' the flange on the basin slab thereof which, in the form shown, is integral with the basin body. The basin is of a type in common use and is form-with a waste orifice A² leading from the bottom of the basin bowl and with a hollow boss A³ at the underside of the bowl and surrounding the orifice A². Through the slab of the bowl is formed a centrally located orifice A⁴ and two similar orifices A⁵, one at each side of the central orifice A⁴. The arrangement of the orifices A², A⁴ and A⁵ is that employed in numerous makes and styles of basins now in use and on the market.

B, represents a metallic nozzle through which the hot, cold, or tempered water is discharged into the basin. As shown, the nozzle is formed with a flange or base B' which bears against the upper side of the basin slab about the margin of the orifice A⁴. A tubular barrel B² forms an extension portion of the nozzle B which projects through the orifice A⁴. As shown in Figs. 1–5, the barrel B² is separable from the nozzle B. The upper portion of the barrel is externally threaded and its upper end is screwed into an opening formed in the base of the nozzle B. A collar or nut C externally threaded on the body of the barrel portion B² of the nozzle is screwed against the under side of the basin slab to secure the nozzle in position. On the lower end of the barrel B² is mounted a hollow mixing chamber fitting part E provided with two hollow legs E², one of which is connected to the cold water supply and the other to the hot water supply, as hereinafter described.

In the construction shown in Figs. 1, 2 and 3, the fitting part E is provided with a central aperture in its upper side slidingly receiving the lower end of the barrel B², and a cap E³ screwed on to the externally threaded boss E' surrounding this aperture forms part of a stuffing box for preventing leakage. Similar caps E³ screwed on to the lower downturned and externally threaded ends of the branches E² of the member E form parts of stuffing boxes in each of which is slidingly and rotatably received the upturned end F² of a corresponding pipe elbow or section F. At the end of the horizontal portion of each pipe section F remote from the upturned end portion F², a stuffing box is provided comprising a cap F' similar to the caps E³. Into the stuffing box thus formed extends a horizontal pipe section G which leads from the discharge port of a corresponding valve barrel H. A valve barrel H passes through each of the passages A⁵ formed in the basin slab A' and is secured in place by nuts H⁴ and H⁵ threaded onto the barrel. Within the barrel H is located a valve member H² connected to a valve spindle H' which can be rotated by the handwheel H⁷ to move the valve member H² into and out of the position in which it closes the valve port H³. The lower end of one barrel H is connected by a coupling member H⁶ to the hot water supply pipe I and the lower end of the other barrel H is connected by a similar coupling H⁶ to the upper end of the cold water supply pipe J.

A tubular member K passes through the waste orifice A² in the bottom of the bowl and is provided at its upper end with an outturned flange K' and a valve seat K². A nut K³ is threaded on the body of the member K to take up against the bottom of the boss A³ or rather against a washer K⁴ interposed between the nut K³ and the boss A³ to secure the barrel K in place and make a tight joint. On to the lower end of the member K is threaded a fitting part M provided with a shoulder M' against which the end of the member K bears, so that when the parts are assembled the member M is always at a fixed distance from the valve seat K² for a purpose hereinafter described. An elongated cylindrical flange K⁵ formed on the underside of the nut K³ surrounds a corresponding flange formed at the upper side of the member M and serves to conceal and protect the threaded portion of the member K regardless of substantial variations in the length of the boss A³ of the particular basin to which the fitting is secured. L represents the valve disk adapted to seat on the valve seat K². Valve disk L is provided with a hollow stem L' slotted between its ends as indicated best at L² in Fig. 5. The lower end of the stem L' is adapted to be engaged to lift the valve off the seat K² by an eccentric pin N' secured to the disk N² carried by a shaft N which passes through the stuffing box M³ formed in one side of the member M. The member M is formed at its underside with a thread M² for connection to the waste pipe proper. On the shaft N, beyond the stuffing box, is secured an arm N³ which is connected by a pin N⁴ to a link O. As shown in Fig. 2, the link O is provided with a series of holes O' through the proper one of which for any particular installation, the pin N⁴ is placed. The upper end of the link O is pivotally connected by a pin P² to a crosshead P' secured to the lower end of the waste valve operating rod P. The latter passes up through the member E and the nozzle B and has swiveled to it at its upper end an operating knob Q, a portion Q' of which enters a cavity B³ formed in the upper side of the nozzle B. The usual key Q³ and corresponding keyway provision may be provided for locking the knob at the proper height above the position shown in Fig. 1 when it is desired to hold the waste valve open.

To permit the proper freedom of movement of the valve operating rod P while guiding the latter and at the same time to avoid leakage, a tubular member D is provided, which in the form shown in Figs. 1, 2 and 3, is threaded at its upper end into an aperture formed in the bottom wall of the socket B³ coaxial with the barrel B² and extends through the member E. The latter is provided with a stuffing box comprising a cap E³ threaded on the externally threaded boss E⁴ coaxial with the boss E' of the member E and formed at the underside of the latter. The tube D is of an external diameter substantially less than the internal diameter of the barrel B² of the fitting so that ample space is provided between the tube D and the barrel B² for the passage of water. With the waste valve operating rod P inserted in a tube such as the tube D, the rod is not only shielded and guided at its lower end by the tube, but the latter, acting in conjunction with a stop or shoulder on the lower end of the rod such as is formed by the fitting P', may be arranged as in the construction illustrated, to positively limit the upward movement of the rod and thereby prevent an excessive and undesired movement of the waste valve mechanism. No claim is made herein however, on the waste valve operating mechanism, as this is claimed in my prior application Serial No. 536,825, filed January 7, 1910, which also discloses but does not claim subject matter claimed herein.

With the apparatus shown in Figs. 1, 2 and 3, after the nozzle B and the two valve barrels are mounted in their respective orifices in the basin slab with the fitting E on the lower end of the barrel B², it is possible by rotating the fitting E about the axis of the barrel B² with or without rotation of the latter and by slightly rotating the valve barrels H to cause the ends of the pipe sections G to enter or withdraw from the stuffing boxes carried at the horizontal ends of the sections F. In consequence it is possible to put in place or remove either of the three main fixture parts without affecting the other two.

The provision of a swivel joint, such as that between the fitting E and each section F, and a telescopic joint such as that between each of sections F and G, extending transversely to the swivel joint in the pipe connection between each valve H and the nozzle B permits the fitting to be readily assembled without any pipe fitting operations on supports where the relative distances between orifice A⁴ and the orifice A⁵ vary appreciably. By adjusting the height of fitting E relative to nozzle B the fitting may also be readily adjusted to supports where the level of the top of orifice A⁴ varies with respect to the level of the tops of orifices A⁵. With the construction illustrated it will be observed that the pipe connection between each of the valve barrels H and the mixing chamber within the barrel B² is formed by two pipe sections (F and E) connected to each other by a swivel joint. This arrangement in conjunction with a telescopic joint such as that between pipe sections F and G not only makes it possible to assemble and adjust the apparatus as above described, but makes it possible to proportion the apparatus to accommodate a much greater variation in the distance between the orifices A⁴ and A⁵ receiving the nozzle and valve members connected than would be possible if the swivel joint were omitted or were so disposed that the pipe sections connected by it could not readily be set at an angle to each other.

After the nozzle and parts immediately connected therewith are in place the waste valve operating rod P can be put in place and connected through the link O to the waste valve operating shaft N, and it is one of the advantages of the construction described that it is difficult with the apparatus disclosed for the fitter to connect the waste valve operating rod to the waste valve in a manner which will not give the proper movement to the eccentric pin N' and thereby to the waste valve. As before pointed out the fitting part M is always at a fixed distance below the valve seat K² regardless of the thickness of the bottom of the basin bowl and the length of boss A². To properly connect the shaft N to the rod P therefore, it is only necessary to insert the pin N⁴ in the uppermost of the holes O' in which the pin can be readily inserted without lifting the valve L off the seat K².

Figs. 6, 7 and 8 illustrate minor modifications of the apparatus shown in Figs. 1–5 inclusive, the modifications consisting in slight changes in the form of the mixing chamber fitting and the manner in which it is connected to the discharge nozzle. The mixing chamber fittings in these three modifications are all alike in that each has a short vertical pipe section threaded into the lower end of each branch E² of the fitting. These vertical pipe sections are received in the upturned ends F⁵ of elbow pipes F⁴. Each of the latter is threaded at each end to receive a corresponding stuffing box cap F³.

In the forms shown in Figs. 6 and 7 the mixing chamber fittings EA and EB respectively, are each provided with a stuffing box at its upper side as in Figs. 1, 2 and 3 to receive the lower end of the barrel B². But in these forms the vertical adjustment of pipe sections G relative to nozzle B is intended to be obtained by adjusting the sections F⁴ relative to section F⁶. In these forms of the invention the aperture in the underside of the fitting EA or EB coaxial with the boss E' is internally threaded to receive a threaded portion of the tubular member surrounding the waste valve operating stem P. In Fig. 6 this tubular member is a tube D' provided with an elongated threaded portion $D^2$ not only in threaded engagement with the under side of the member EA at $E^5$, but also with a clamping nut R which serves as a lock nut and also as a means for compressing the packing R' to make a tight joint between the tube D' and the fitting member EA. In Fig. 7 the rod inclosing tube $D^2$ is formed in two sections $D^3$ and $D^4$, each of which is formed with pipe threaded ends entering the opposite ends of the threaded socket $E^6$ formed in the underside of the member EB coaxial with the boss E'.

In Fig. 8 the barrel $B^2$ is formed at its lower end with an outturned flange $B^4$ which enters a socket $E^7$ formed in the upper side of the member EC and engages a packing washer $R^2$. In this form the tube $D^5$ surrounding the rod P is externally threaded at its lower end to receive a nut S by which the parts are drawn together, a washer S' being interposed between the member EC and the nut S to make tight the joint between the underside of the member E and the tube $D^5$.

The modification shown in Figs. 9 and 10 differs from the forms of apparatus previously described in that the discharge nozzle BB is formed with an integral barrel portion $B^{20}$ at the lower end of which the mixing chamber fitting ED is connected by a short pipe section $E^9$ and a sleeve $E^{10}$ swiveled on the pipe section $E^9$ and threaded on to the lower end of the barrel portion $B^{20}$. In this form of apparatus the waste valve operating shaft N has affixed to it a counter-balancing arm $N^5$ so that the waste valve L tends to remain in any position into which it may be moved. The waste valve operating rod P is provided at its upper end with a simple operating knob or handle Q, and no provisions are made for locking the handle or rod in an elevated position.

The construction illustrated by Figs. 11 and 12 differs from that shown in Figs. 9 and 10 in the fact that the mixing fitting EE has its two branches terminating in radial portions $E^{11}$ which are telescopically received each in a corresponding elbow pipe section $F^{40}$. In this construction the pipe sections GA extending from the hot and cold water faucet barrels G, G, are formed each with an upturned end G' telescopically received in the downturned arm of the corresponding elbow $F^{40}$. It will be apparent from the drawings, and especially from Fig. 12, that the complete fittings of Figs. 11 and 12 possess exactly the same kind of capacity of adjustment to accommodate variations in the location of the three fixture receiving orifices of the basin slab to which the fitting is applied as do the constructions previously described.

Figs. 13 and 14 illustrate the use of the invention in connection with a lavatory structure in which the latter has formed in it a mixing chamber and a discharge passage from said chamber to the basin proper formed in said structure. In these figures AA, represents the basin structure, $A^{10}$ the mixing chamber formed in it, and $A^{11}$ the discharge nozzle passage leading from the mixing chamber $A^{10}$ to the basin bowl. $A^{12}$ represents the usual overflow passage formed in the basin structure and communicating with the waste valve fixture below the seat for the waste valve L. As shown the mixing chamber $A^{10}$ is in the form of a vertical passage extending through the basin slab or flange. The mixing chamber fitting EF is essentially the same in character as the mixing chamber fitting EC of Fig. 8, but in this case the fitting is clamped directly against the seat $A^{13}$ formed on the underside of the basin slab, $R^4$ representing an interposed gasket for securing a tight joint. The means for clamping the fitting EF in place comprises a head member $T^4$ which with its gasket $R^5$ closes the upper end of the chamber $A^{10}$ and has attached to it a tubular member T' which passes downward through the passage $A^{10}$ and through the mixing chamber fitting EF and at its lower end is externally threaded to receive clamping nuts $T^2$ for locking the parts together. $R^6$ represents a gasket for securing the tight joint at the lower side of the mixing chamber fitting. The member T with its extension T' forms a guide for the waste valve rod P, and the handle Q for the latter is located above an escutcheon member $T^3$, covering the member T and connected to the latter, as shown, by the flanged and threaded sleeve $T^4$.

The construction shown in Figs. 15 to 1, inclusive differs from that shown in Figs. 13 and 14 in that the mixing chamber $A^{100}$ formed in the basin slab is open at the lower side of the basin slab only and the mixing chamber fitting EG, which may be identical with the mixing chamber fitting EF of Figs. 13 and 14 is secured in place by a tubular member $T^{10}$ which may be slotted at $T^{13}$ and is formed with a flanged head $T^{11}$ which bears against a seat formed in the basin slab. At its lower end the member $T^{10}$ is threaded to receive a blind clamping nut $T^{12}$. In this construction $R^4$ and $R^6$ represent gaskets employed as in Figs. 13 and 14. In the preferred construction illustrated, the lower portion of the chamber $A^{100}$ in the basin structure is in the form of a port $A^{101}$ notched to receive the head $T^{11}$ of the member $T^{10}$ so that the head T' may be moved axially through the port $A^{101}$ and after being fully entered may be rotated to the position shown in Fig. 17, in which the ends of the head $T^{11}$ bear on the portions of the basin slab at the curved sides of the port $A^{101}$. In this construction the waste valve operating mechanism cannot extend through the mixing chamber fitting, and as shown, the discharge orifice in the bottom of the basin bowl is closed when desired by a simple plug L A attached to the basin structure by the chain L⁵.

It will be understood, of course, that the mixing chamber fitting EF of the Figs. 13 and 14, and the fitting EE, shown in Figs. 15 and 16, are each intended to be coupled to hot and cold water valve casings mounted in the same basin structure, as the mixing chamber fitting E of Fig. 2 is connected to the two valve casings H in that figure.

While in accordance with the provisions of the statutes I have illustrated and described the best forms of my invention now known to me it will be apparent to those skilled in the art that changes may be made in the form of the apparatus disclosed without departing from the spirit of my invention, and that under some conditions it may be of advantage to use certain features of the invention without a corresponding use of the others.

Having now described my invention what I claim as new and desire to secure by Letters Patent is,

1. A combination hot and cold water supply fixture comprising in combination, separate hot and cold water supply valve casings, a mixing chamber member, provisions for mounting said valve casings and member on a common support with freedom for angular adjustment, with respect to said support, of each about an axis separate from, but substantially parallel to the corresponding axes of the others, and separate pipe connections between said member and the two valve casings, each connection including a swivel joint, the axis of which is parallel to and laterally displaced from said axes, and a telescopic joint the axis of which is transverse to said axes.

2. A combination hot and cold water supply fixture comprising in combination, separate hot and cold water supply valve casings, a mixing chamber member, provisions for mounting said valve casings and member on a common support with freedom for angular adjustment, with respect to said support, of each about an axis separate from, but parallel to the corresponding axes of the others, and separate pipe connections between said member and the two valve casings, each connection including a pipe extension from said member and a pipe extension from the corresponding casing, one extension being transverse, and the second parallel to but laterally displaced from said axes, and an elbow pipe telescoping at its opposite ends with said pipe extensions and angularly adjustable with respect to said second extension.

3. A combination hot and cold water supply fixture comprising in combination, separate hot and cold water supply valve casings, a mixing chamber member, provisions for mounting said valve casings and member on a common support with freedom for angular adjustment, with respect to said support, of each about an axis separate from, but parallel to the corresponding axes of the others, and separate pipe connections between said member and the two valve casings, each connection including a pipe extension from said member and a pipe extension from the corresponding casing, one extension being transverse, and the second parallel to but laterally displaced from said axes, an elbow pipe and stuffing box connections between the ends of the pipe and said pipe extension permitting adjustment of said elbow pipe angularly and axially with respect to each pipe extension.

4. In combination, a basin slab formed with three laterally displaced fixture receiving apertures, a hot water supply valve casing mounted in and angularly adjustable in one of said apertures, a cold water supply valve casing mounted in and angularly adjustable in another of said apertures, provisions for clamping said casings in place, a discharge nozzle on the upper side of the slab, a mixing chamber member, a tubular connection between said nozzle and member extending through the third aperture, said mixing chamber being angularly adjustable with respect to said aperture, pipe connections at the under side of said slab between said mixing chamber member and each of said valve casings, each pipe connection comprising a pipe extension from the corresponding valve casing, a pipe extension from the mixing chamber and an elbow pipe with telescopic joints between said pipe extensions and elbow pipe, the joint between one of said pipe extensions at least and the elbow pipe permitting angular adjustment of the elbow pipe and pipe extension.

WILLARD A. SPEAKMAN.

Witnesses:
  W. HAROLD SMITH,
  CHARLES G. GUYER.